United States Patent
Case et al.

(10) Patent No.: US 7,039,178 B2
(45) Date of Patent: May 2, 2006

(54) SYSTEM AND METHOD FOR GENERATING A SIMULTANEOUS MIXED AUDIO OUTPUT THROUGH A SINGLE OUTPUT INTERFACE

(75) Inventors: Eliot M. Case, Denver, CO (US); Judith L. Weirauch, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 871 days.

(21) Appl. No.: 09/871,417

(22) Filed: May 31, 2001

(65) Prior Publication Data

US 2002/0048361 A1   Apr. 25, 2002

Related U.S. Application Data

(60) Provisional application No. 60/241,675, filed on Oct. 19, 2000.

(51) Int. Cl.
*H04M 1/00* (2006.01)

(52) U.S. Cl. .......................... 379/387.01; 379/399.01; 379/93.23

(58) Field of Classification Search .......... 379/387.01, 379/399.01, 93.23
See application file for complete search history.

(56) References Cited

U.S. PATENT DOCUMENTS

| | | | |
|---|---|---|---|
| 6,141,597 A | * | 10/2000 | Botzko et al. ......... 379/202.01 |
| 2002/0057779 A1 | * | 5/2002 | Ahuja et al. ........... 379/202.01 |
| 2002/0085697 A1 | * | 7/2002 | Simard et al. ......... 379/202.01 |

OTHER PUBLICATIONS

197 USPQ 342 *Duplan Corp. v Deering Milliken, Inc.*\*

\* cited by examiner

*Primary Examiner*—Jefferey F. Harold
(74) *Attorney, Agent, or Firm*—Brooks Kushman P.C.

(57) ABSTRACT

A computer to telephone interface card comprises a plurality of audio data input ports, a mixer, and a converter. The mixer receives audio input data from audio data input ports and, in real-time, generates a mixed audio output data signal at the mixer output. The converter has an output connecting to a phone line to generate and provide mixed audio output to the phone line based on the audio input data received at the plurality of audio data input ports.

16 Claims, 2 Drawing Sheets

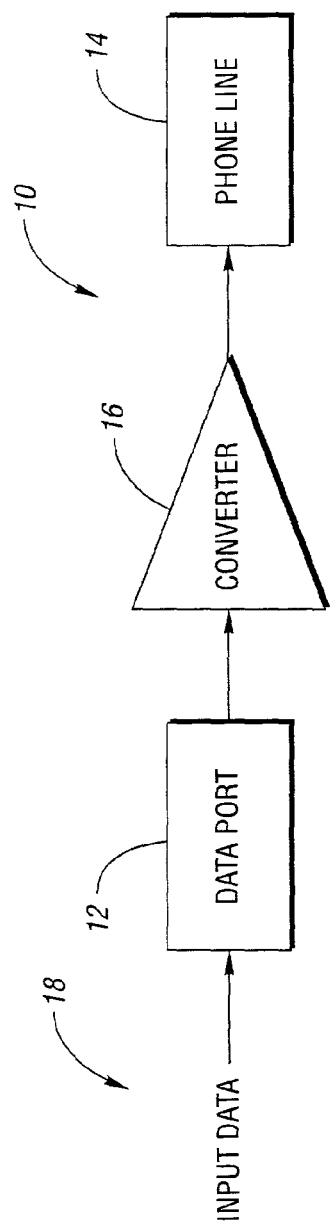
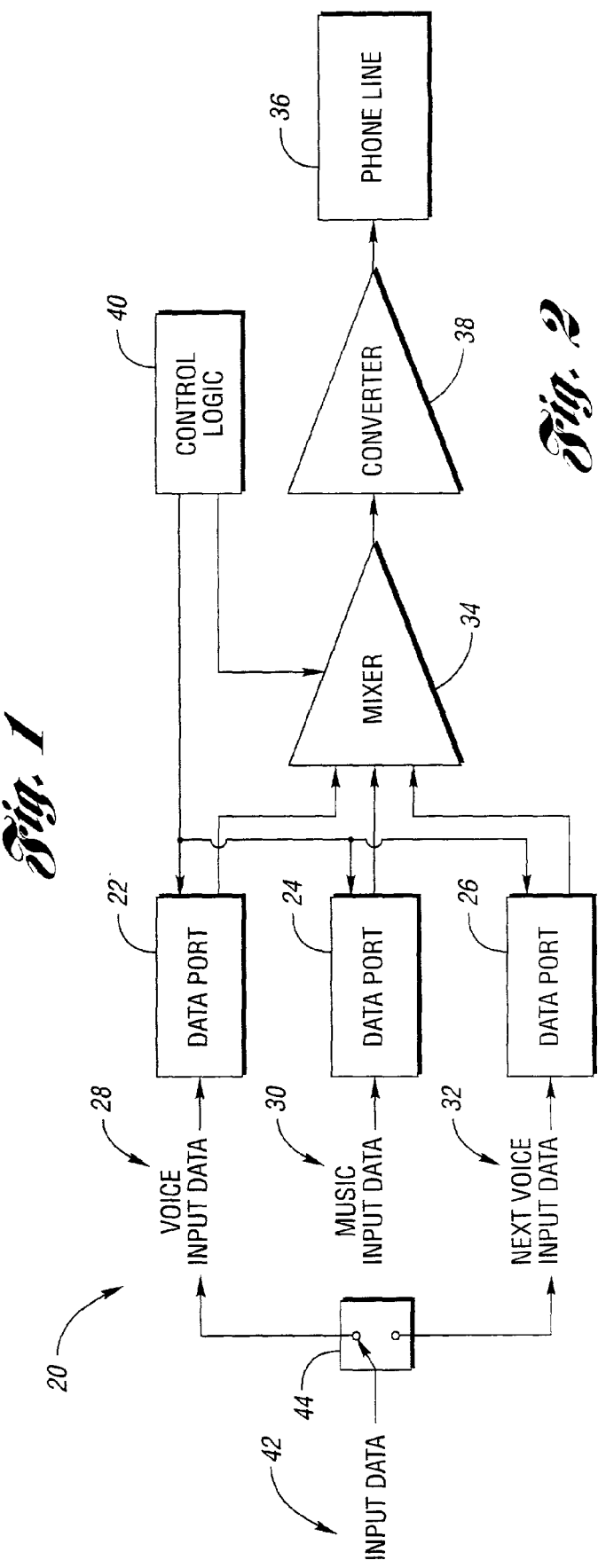

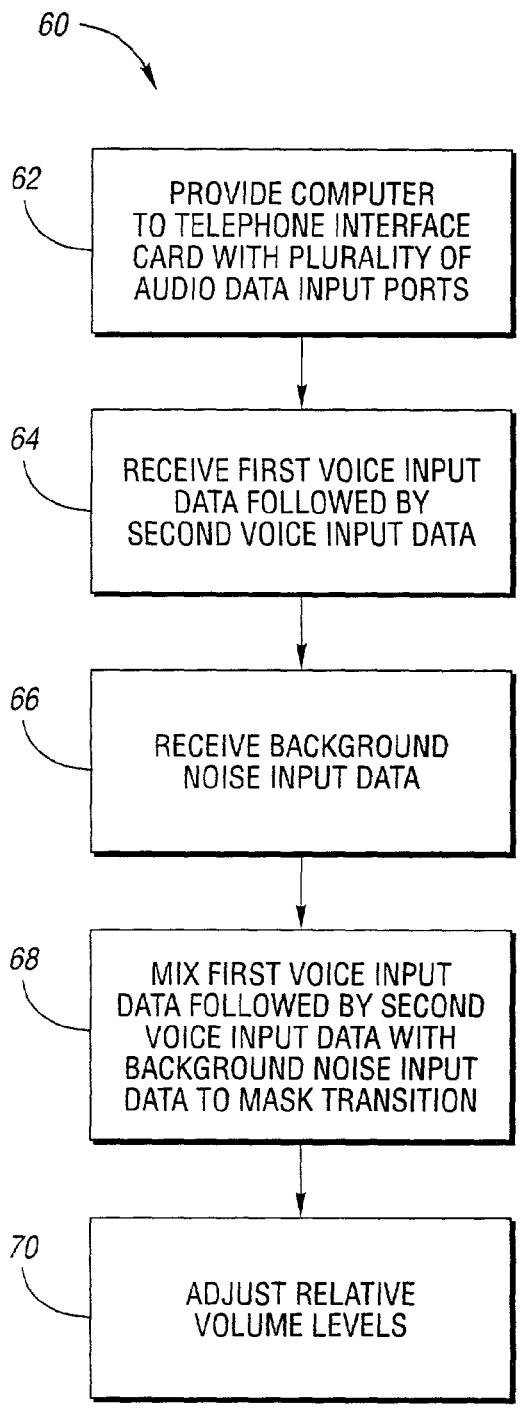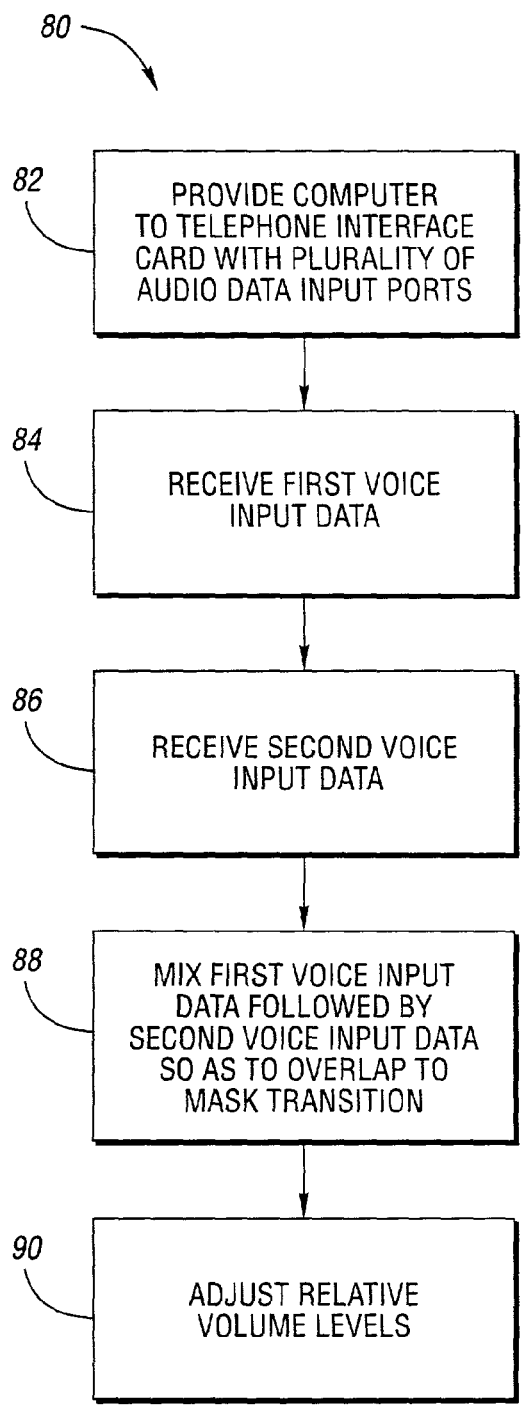

SYSTEM AND METHOD FOR GENERATING A SIMULTANEOUS MIXED AUDIO OUTPUT THROUGH A SINGLE OUTPUT INTERFACE

CROSS-REFERENCE TO RELATED APPLICATION

This application claims the benefit of U.S. provisional application Ser. No. 60/241,675, filed on Oct. 19, 2000 and entitled "System and Method for Generating a Simultaneous Mixed Audio Output Through a Single Output Interface."

BACKGROUND OF THE INVENTION

1. Field of the Invention

The present invention relates to a system and method for generating a simultaneous mixed audio output through a single output interface, particularly for use in an automated telephone information and/or Interactive Voice Response ("IVR") system.

2. Background Art

It is well known to use concatenated voice prompts as the audio output in automated telephone information and/or IVR systems. In doing so, only one sound file in a string of sound files plays at any one time. As a result, there is a tendency for abrupt changes in the concatenated playback to be very noticeable.

FIG. 1 is a simplified block diagram of a prior art system and method for generating concatenated voice prompts in an automated telephone information and/or IVR system, denoted generally by reference numeral 10. As is well known in the art, such a system and method is typically embodied in automated telephone information and IVR systems in the form of a computer to telephone interface card.

As seen in FIG. 1, hardware manufacturers of interface cards for such telephone and IVR systems provide only a single data port or address (12) for receiving audio data (18). That data port (12) is accessed by a main processor or control logic (not shown), which subsequently transmits the data through a single output interface over a phone line (14) after the conventional processing required to do so by converter (16). As those of ordinary skill will appreciate, converter (16) may be a digital-to-analog converter or a format converter (single data channel into a multiplexed data channel), depending on whether phone line (14) has an analog or digital format.

As is readily apparent to those of ordinary skill, if two or more audio signals are to be mixed together for use in such a system and method, the data for the two signals must be mixed in advance. That is, the audio data from the two signals must first be mixed, and it is the resulting mixed audio data that is sent to the single data port (12) of the interface card. Such an advance mixing operation generally takes a significant amount of main processor time. Moreover, such advance mixing must also typically be performed on complete sound files before sending the completed mixed file to data port (12) of the interface card. As a result, such advance mixing is not a real-time operation.

For the foregoing reasons, there is a need for an improved computer to telephone interface card and associated method that overcomes the limitations of the prior art.

SUMMARY OF THE INVENTION

It is, therefore, an object of the present invention to provide a computer to telephone interface card and associated method, wherein mixed audio output is generated and provided to a phone line based on audio input data received at a plurality of audio data input ports.

In carrying out the above object, a computer to telephone interface card is provided. The interface card comprises a plurality of audio data input ports for receiving audio input data from the computer, a mixer and a converter. The mixer has a plurality of inputs in communication with the plurality of audio data input ports. The mixer further has an output. The plurality of mixer inputs receive the audio input data. The mixer, in real-time, generates a mixed audio output data signal at the mixer output. The converter has an input receiving the mixed audio output data signal. The converter further has an output for connecting to a phone line. The converter generates and provides a mixed audio output to the phone line based on the audio input data received at the plurality of audio data input ports.

The converter may be, for example, a digital-to-analog converter or a format converter (single data channel into a multiplexed data channel), depending on whether the phone line has an analog or digital format. In a preferred implementation, the plurality of audio data input ports further comprises a plurality of buffered audio data input ports. Buffering at the audio data input ports facilitates masking of voice edits with noise or music and/or overlapping the end of one sound file with the beginning of the next sound file to improve sound quality of a concatenated speech output. In some implementations, the interface card further comprises a switch configured to receive the audio input data from the computer and to distribute the data to the plurality of audio data input ports.

Further, in carrying out the present invention, a method of providing mixed audio output to a phone line is provided. The method comprises providing a computer to telephone interface card. The interface card includes a plurality of audio data input ports for receiving audio input data from the computer, and a mixer having a plurality of inputs in communication with the plurality of audio data input ports. The mixer has an output. The plurality of mixer inputs receive the audio input data and the mixer, in real-time, generates a mixed audio output data signal at the mixer output. The interface card further includes a converter having an input receiving the mixed audio output data signal. Further, the converter has an output for connecting to the phone line to generate and provide mixed audio output to the phone line based on the audio input data received at the plurality of audio data input ports.

In a preferred embodiment, the method further comprises receiving first voice input data followed by second voice input data at the plurality of audio data input ports. Background noise input data is received at the plurality of audio data input ports. The first voice input data followed by the second voice input data is mixed with the background noise input data. This type of mixing is useful in many applications such as, for example, playing music or other background noise underneath voice audio. The voice audio may be concatenated speech or may be other forms of audio such as spaced apart pieces of audio. In a concatenated speech application, the first voice input data is followed immediately by the second voice input data, and the mixing masks a transition between the first voice input data and the second voice input data. Further, preferably, mixing further comprises adjusting relative volume levels of the first voice input data, the second voice input data, and the background noise input data to further mask the transition between the first voice input data and the second voice input data.

A preferred method further comprises providing a plurality of buffered audio data input ports on the interface card. More preferably, the method further comprises receiving first voice input data at the plurality of buffered audio data input ports, receiving second voice input data at the plurality of buffered audio data input ports, and mixing the first voice input data followed by the second voice input data. The first voice input data followed by the second voice input data is mixed so as to overlap an end of the first voice input data with a beginning of the second voice input data to mask a transition between the first voice input data and the second voice input data. Preferably, mixing further comprises adjusting relative volume levels of the first voice input data and the second voice input data to further mask the transition between the first voice input data and the second voice input data.

In a preferred implementation, in addition to mixing the first voice input data followed by the second voice input data so as to overlap and mask the transition, the method further comprises receiving background noise input data at the plurality of buffered audio data input ports, and mixing the first voice input data followed by the second voice input data with the background noise input data to further mask the transition between the first voice input data and the second voice input data. That is, embodiments of the present invention comprehend utilizing background noise input data to mask voice edit points as well as comprehend utilizing overlapping the end of one sound file with the beginning of the next sound file to improve the sound quality of the concatenated speech output.

The advantages associated with embodiments of the present invention are numerous. In accordance with the present invention, audio in the form of music, noise or another form may be played back simultaneously with concatenated voice output or another form of audio output. Some of the voice end points or edit points can be masked by the noise or music, producing an improved output sound quality. Further, by overlapping the end of one sound file with the beginning of the next sound file, improvement in the sound quality of concatenated speech output can be realized.

According to the present invention, a system and method are provided that mix and/or level adjusts two or more audio data inputs, at either the hardware level or higher, to generate a simultaneous audio output of those two or more audio input signals. In so doing, the present invention enables the ability to place music or another form of audio output under speech outputs or voice recordings, and allows audio files to overlap, thereby providing an improved quality, and smoother sounding audible output signals.

The above object and other objects, features, and advantages of the present invention will be readily appreciated by one of ordinary skill in the art in the following detailed description of the preferred embodiment when taken in connection with the accompanying drawings.

BRIEF DESCRIPTION OF THE DRAWINGS

FIG. 1 is a simplified block diagram of a prior art system and method for generating concatenated voice prompts, such as in an automated telephone information or IVR system;

FIG. 2 is a simplified block diagram of the system and method of the present invention for generating a simultaneous mixed audio output through a single output interface, such as in an automated telephone information or IVR system;

FIG. 3 illustrates a method of the present invention; and

FIG. 4 illustrates another method of the present invention.

DETAILED DESCRIPTION OF THE PREFERRED EMBODIMENT

Referring to FIG. 2, a simplified block diagram of the system and method of the present invention for generating a simultaneous mixed audio output through a single output interface is shown, denoted generally by reference numeral The system and method (20) of the present invention preferably utilize the well known co-processors of the computer to telephone interface cards to at least mix, and preferably to also adjust relative volume or gain levels, of two or more separate audio data input signals. In that regard, by assigning a small amount of co-processor operations to access audio input data at several data addresses or buffers, and perform simple math to mix these simultaneous input data signals together, many well known audio production methods can be performed on automated telephone information and/or IVR systems.

More specifically, as seen in FIG. 2, the system and method (20) of the present invention provide a plurality of data ports, addresses or buffers (22, 24, 26) for audio data from multiple simultaneous audio input signals (28, 30, 32). The plurality of audio input signals (28, 30, 32) may represent voice, music, noise or other forms of audio. While FIG. 2 depicts three data ports (22, 24, 26), those of ordinary skill will recognize that the method and system (20) of the present invention contemplate any number of data ports.

Referring still to FIG. 2, data ports (22, 24, 26) are separately addressable and accessible by a main processor or control logic (not shown), and the data from each may be simultaneously transmitted to a mixer (34). Using techniques well known to those of ordinary skill in the art, mixer (34) mixes the data from simultaneous input signals (28, 30, 32) to generate a mixed audio output data signal for subsequent transmission through a single output interface over a phone line (36) after the conventional processing required to do so by converter (38). Once again, as those of ordinary skill will appreciate, converter (38) may be a digital-to-analog converter or a format converter (single data channel into a multiplexed data channel), depending on whether phone line (36) has an analog or digital format. Again using well known conventional techniques, mixer (34) also preferably adjusts the relative volume or gain levels of the multiple audio data input signals (28, 30, 32).

As depicted in FIG. 2, the system and method (20) of the present invention also include optional control logic (40), which is provided in communication with mixer (34) and/or data ports (22, 24, 26). Control logic (40) enables appropriate direction of mixer (34) to perform the desired operation on the audio data from input signals (28, 30, 32), such as the mixing and/or level adjusting operations described above. In that regard, control logic (40) may direct the selection of the particular audio input signals (28, 30, 32) to be used in such operations. Specifically, control logic (40) may direct the selection of input signals (28, 30, 32) representing music and multiple voice files for mixing and/or level adjusting by mixer (34) so that at playback the music effectively masks edits in the concatenated output of the multiple voice files, thereby improving the sound quality of the concatenated speech output. In addition, embodiments of the present invention are useful in other applications besides concatenated speech output. For example, the present invention comprehends playing music or other background noise underneath voice audio that may be concatenated speech or may be another form of audio.

Alternatively, control logic (40) may direct the selection of input signals (28, 30, 32) representing multiple voice files to be concatenated by overlapping the end of one voice file with the beginning of the next voice file, again improving the sound quality of the concatenated speech output. For such an operation, data ports (22, 24, 26) comprise FIFO (First-In, First-Out) buffers, and are controlled by control logic (40) so that when playback of one voice file from input data (28, 30, 32) is about to end, playback of the next voice file from input data (28, 30, 32) begins. Specifically, based on the information contained in the voice files from input data (28, 30, 32), control logic (40) controls playback timing, including when playback of one voice file from input data (28, 30, 32) stops, and when playback of the next voice file from input data (28, 30, 32) begins. Still further in that regard, where voice files from input data (28, 30, 32) are provided to data ports (22, 24, 26) by a single source (42), a distributor or switch (44) may be included to distribute each voice file from input data (28, 30, 32) to a different FIFO data port (22, 24, 26) in order to accomplish the same overlapping operation as just described.

The system and method (20) of the present invention are preferably embodied in an automated telephone information and/or IVR systems in the form of a computer to telephone interface card having multiple, separately accessible data ports, addresses or buffers (22, 24, 26). As previously described, a small amount of operations of the co-processor in such an interface card may be assigned to simultaneously access data from multiple audio input signals (28, 30, 32) at the multiple data ports (22, 24, 26), and to perform the operations required to mix and/or level adjust the simultaneous input data signals (28, 30, 32). That is, mixer (34) and control logic (40) may be embodied by such a co-processor. However, as those of ordinary skill in the art will appreciate, mixer (34) and control logic (40) may alternatively be embodied in other well known fashions, such as through hardware, software, or a combination thereof, as in an appropriately programmed microprocessor.

As is readily apparent from the foregoing description, in an automated telephone information and/or IVR system, the present invention provides a system and method that mix and/or level adjust two or more simultaneous audio data inputs, at either the hardware level or higher, to generate an audio output for transmission through a single output interface. In so doing, the present invention enables the ability to place music or another form of audio output under concatenated speech outputs or voice recordings or other audio that may or may not be concatenated, and allows concatenated audio files to overlap, thereby providing an improved quality, smoother sounding audible output signal. In contrast to the prior art, the present invention does not require such mixing and/or level adjusting operations to be performed in advance, before sending a completed file to a computer to telephone interface card data port. The present invention thereby enables such mixing and/or level adjusting operations to be undertaken in real-time, without using a significant amount of main processor time.

In FIG. 3, a method of the present invention is generally indicated at (60). At block (62), a computer to telephone interface card with a plurality of audio data input ports is provided. At block (64), first voice input data followed by second voice input data is received. At block (66), background noise input data is received. The first voice input data followed by the second voice input data is mixed with the background noise input data. In a concatenated speech application, the mixing masks a transition between the first voice input data and the second voice input data, at block (68). That is, the background noise input data, which may be music or any other form of noise, effectively masks the voice edit points (or voice end points). At block (70), preferably, relative volume levels of the first voice input data, the second voice input data, and the background noise input data are adjusted. In a concatenated speech application, the adjusting further masks the transition between the first voice input data and the second voice input data.

In FIG. 4, another method of the present invention is generally indicated at (80). At block (82), a computer to telephone interface card with a plurality of audio data input ports is provided. At block (84), first voice input data is received. At block (86), second voice input data is received. The first voice input data followed by the second voice input data is mixed so as to overlap and end of the first voice input data with a beginning of the second voice input data to mask a transition between the first voice input data and the second voice input data, at block (88). Preferably, at block (90), relative volume levels of the first voice input data and the second voice input data are adjusted to further mask the transition between the first voice input data and the second voice input data.

Preferred embodiments of the present invention utilize background noise and/or overlapping to mask transitions between adjacent voice data files during concatenation. It is appreciated that the masking with background noise and the masking with overlapping may take many forms in accordance with the logic illustrated in FIG. 2, and that the examples given herein are not meant to be limiting. For example, buffered data port (22, 24, 26) and switch (44) provide much versatility to embodiments of the present invention, as is appreciated by reviewing the above description. In addition, embodiments of the present invention are not limited to concatenated speech applications. For example, music or other background noise may be placed underneath other forms of speech.

While various embodiments of the present invention have been illustrated and described, it is not intended that these embodiments illustrate and describe all possible forms of the present invention. Rather, the words used herein are words of description rather than limitation, and it is understood that various changes may be made without departing from the spirit and scope of the present invention.

What is claimed is:

1. A computer to telephone interface card comprising:
    a plurality of audio data input ports for receiving audio input data from the computer;
    a mixer having a plurality of inputs in communication with the plurality of audio data input ports, and having an output, the plurality of mixer inputs receiving the audio input data and the mixer, in real-time, generating a mixed audio output data signal at the mixer output; and
    a converter having an input receiving the mixed audio output data signal, and having an output for connecting to a phone line to generate and provide mixed audio output to the phone line based on the audio input data received at the plurality of audio data input ports.

2. The interface card of claim 1 wherein the converter further comprises:
    a digital-to-analog converter.

3. The interface card of claim 1 wherein the converter further comprises:
    a format converter.

4. The interface card of claim 1 wherein the plurality of audio data input ports further comprises:
    a plurality of buffered audio data input ports.

5. The interface card of claim 4 further comprising:
a switch configured to receive the audio input data from the computer and to distribute the data to the plurality of audio data input ports.

6. A method of providing mixed audio output to a phone line, the method comprising:
providing a computer to telephone interface card including a plurality of audio data input ports for receiving audio input data from the computer, and a mixer having a plurality of inputs in communication with the plurality of audio data input ports, the mixer having an output, the plurality of mixer inputs receiving the audio input data and the mixer, in real-time, generating a mixed audio output data signal at the mixer output, the interface card further including a converter having an input receiving the mixed audio output data signal, and having an output for connecting to the phone line to generate and provide mixed audio output to the phone line based on the audio input data received at the plurality of audio data input ports.

7. The method of claim 6 further comprising:
receiving first voice input data followed by second voice input data at the plurality of audio data input ports;
receiving background noise input data at the plurality of audio data input ports; and
mixing the first voice input data followed by the second voice input data with the background noise input data.

8. The method of claim 7 wherein the first voice input data is followed immediately by the second voice input data to form concatenated speech, and wherein the mixing masks a transition between the first voice input data and the second voice input data.

9. The method of claim 8 wherein mixing further comprises:
adjusting relative volume levels of the first voice input data, the second voice input data, and the background noise input data to further mask the transition between the first voice input data and the second voice input data.

10. The method of claim 6 further comprising:
providing a plurality of buffered audio data input ports on the interface card.

11. The method of claim 10 further comprising:
receiving first voice input data at the plurality of buffered audio data input ports;
receiving second voice input data at the plurality of buffered audio data input ports; and
mixing the first voice input data followed by the second voice input data so as to overlap an end of the first voice input data with a beginning of the second voice input data to mask a transition between the first voice input data and the second voice input data.

12. The method of claim 11 wherein mixing further comprises:
adjusting relative volume levels of the first voice input data and the second voice input data to further mask the transition between the first voice input data and the second voice input data.

13. The method of claim 11 further comprising:
receiving background noise input data at the plurality of buffered audio data input ports; and
mixing the first voice input data followed by the second voice input data with the background noise input data to further mask the transition between the first voice input data and the second voice input data.

14. The method of claim 6 further comprising:
providing the converter with a digital-to-analog converter.

15. The method of claim 6 further comprising:
providing the converter with a format converter.

16. The method of claim 6 further comprising:
providing the plurality of audio data input ports with a plurality of buffered audio data input ports.

* * * * *

UNITED STATES PATENT AND TRADEMARK OFFICE
CERTIFICATE OF CORRECTION

PATENT NO. : 7,039,178 B2
APPLICATION NO. : 09/871417
DATED : May 2, 2006
INVENTOR(S) : Case et al.

It is certified that error appears in the above-identified patent and that said Letters Patent is hereby corrected as shown below:

Column 4, line 9, after "numeral" insert --20.--

Signed and Sealed this

Twenty-second Day of August, 2006

JON W. DUDAS
*Director of the United States Patent and Trademark Office*